United States Patent [19]

Upton

[11] Patent Number: 4,653,142
[45] Date of Patent: Mar. 31, 1987

[54] EXTENSIBLE TOOL HANDLE

[75] Inventor: Gene Upton, Mission Viejo, Calif.

[73] Assignee: Reach High Products, Inc., San Diego, Calif.

[21] Appl. No.: 874,277

[22] Filed: Jun. 13, 1986

Related U.S. Application Data

[63] Continuation of Ser. No. 651,898, Sep. 19, 1984, abandoned.

[51] Int. Cl.⁴ .................................................. B25G 1/04
[52] U.S. Cl. .................................... 16/115; 273/80 D; 16/DIG. 41; 403/350
[58] Field of Search .......... 16/115, DIG. 5, DIG. 24, 16/DIG. 25, DIG. 41; 273/80 D; 56/332; 43/12; 403/350; 15/143 B, 144 B

[56] References Cited

U.S. PATENT DOCUMENTS

| | | | |
|---|---|---|---|
| 843,590 | 12/1907 | Dunn et al. | 15/234 |
| 935,885 | 10/1909 | Blake | 403/350 |
| 1,138,244 | 5/1915 | Parker | 15/143 |
| 2,196,459 | 4/1940 | Forsberg . | |
| 2,980,456 | 4/1961 | McMullin | 16/115 |
| 2,984,852 | 5/1961 | George | 15/234 |
| 3,040,356 | 6/1962 | Vosbikian et al. | 15/147 |
| 3,153,252 | 10/1964 | Ricciardi | 15/143 B |
| 3,175,590 | 3/1965 | Belknap . | |
| 3,244,434 | 4/1966 | Belicka et al. . | |
| 3,866,257 | 2/1975 | Cansdale, Sr. | 15/144 R |
| 3,938,218 | 2/1976 | DeAmicis . | |
| 4,345,351 | 8/1982 | Moss et al. | 15/144 B |
| 4,461,057 | 7/1984 | Unger | 16/115 |

FOREIGN PATENT DOCUMENTS

| | | | |
|---|---|---|---|
| 732978 | 4/1966 | Canada | 273/80 D |
| 470745 | 12/1927 | Fed. Rep. of Germany | 15/144 B |
| 2258059 | 11/1972 | Fed. Rep. of Germany . | |
| 408375 | 4/1934 | United Kingdom | 273/80 D |
| 1338255 | 11/1973 | United Kingdom | 273/80 D |

Primary Examiner—M. Jordan
Attorney, Agent, or Firm—Brown, Martin, Haller & Meador

[57] ABSTRACT

A tool such as a cleaning tool has an extensible handle comprising two or more telescoping tubes of elliptical or other noncircular cross-section which, when their axes are aligned, may be freely telescoped relative to one another until a desired extension is reached, and may then be rotated out of alignment to bind the tubes together.

10 Claims, 12 Drawing Figures

4,653,142

EXTENSIBLE TOOL HANDLE

BACKGROUND OF THE INVENTION

This is a continuation of application Ser. No. 651,898 filed Sept. 19, 1984, now abandoned.

The present invention relates to extensible handles for tools such as cleaning tools which are required for use in remote locations.

Household cleaning tools such as feather dusters and vacuum cleaning tools, and gardening tools such as clippers and pruning shears often need to be used in relatively inaccessible locations such as the corners of ceilings. The household cleaning tools like the feather dusters normally have fairly short handles and it is difficult to reach ceilings with them. Vacuum cleaner tubes are often provided with extensible flexible hoses and separate extension tubes with locking arrangements which are relatively difficult to use, and cannot readily be extended.

Other types of tools which are also often needed in inaccessible locations are paint brushes, pruning shears, and the like. Such locations are often reached using ladders, and these tools could be used more safely if provided with an easily extensible, secure handle.

SUMMARY OF THE INVENTION

It is an object of the present invention to provide an extensible handle for tools to allow the tools to reach otherwise inaccessible locations.

It is a further object of the invention to provide such a handle which can be readily changed in length.

According to the present invention, an extensible handle for a tool is provided which comprises at least two telescoping inner and outer cylinders of elliptical cross-section. When the elliptical axes of the cylinders are aligned, they can be telescoped in and out of each other to the desired length. The cylinders are then rotated out of alignment so that the opposing elliptical surfaces bind and secure and substantially seal the cylinders together.

In a preferred embodiment of the invention, several telescoping elliptical cylinders or tubes are provided to allow a large variation between the maximum and minimum lengths of the handle. A tool such as a feather duster or pruning shears may be secured to one end of the handle.

Thus the length of the handle can be quickly and easily adjusted according to the location in which the tool is to be used by simply rotating the elliptical cylinders into alignment, sliding them relative to one another until a desired length is reached, and then rotating them out of alignment to bind their relative position together.

BRIEF DESCRIPTION OF THE DRAWINGS

The above described in other objects, advantages and features of the present invention will become more readily apparent from a review of the following specification when taken in conjunction with the drawings, wherein.

DESCRIPTION OF THE PREFERRED EMBODIMENT

Figure 1:
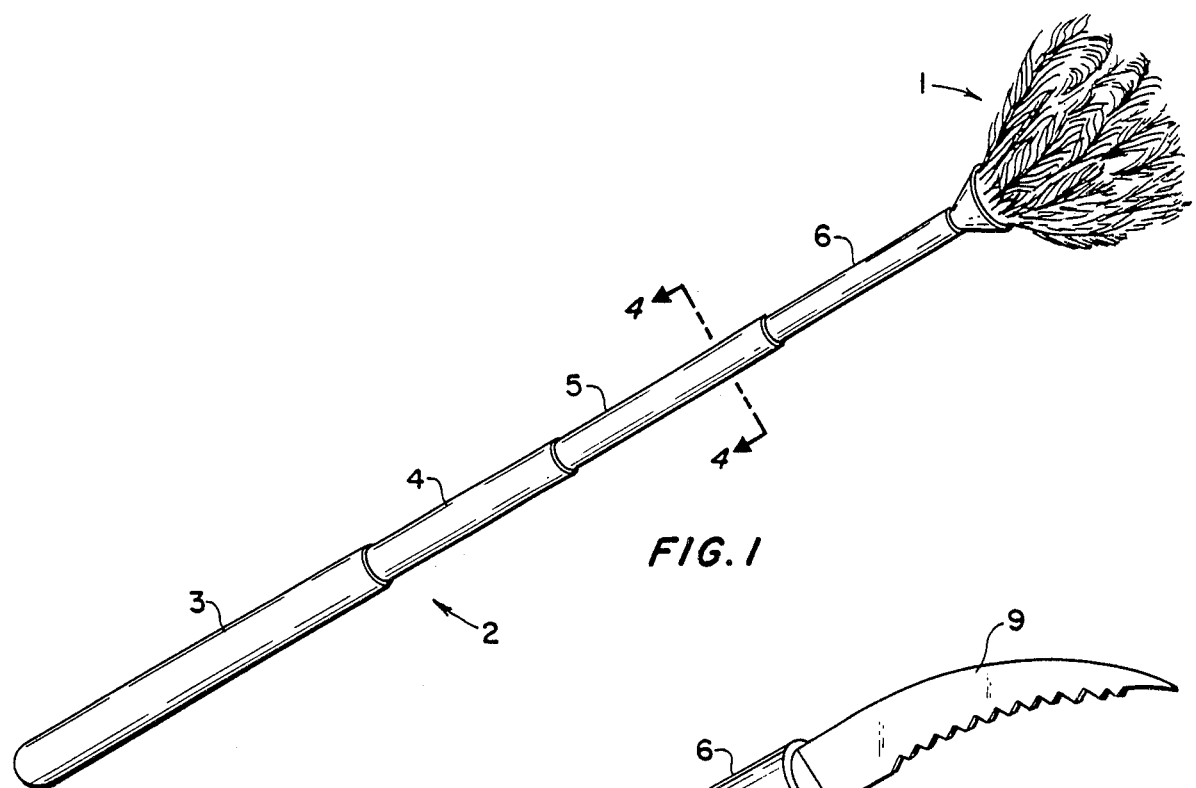
FIG. 1 is a perspective view of a feather duster having an extensible handle according to a preferred embodiment of the invention.

The drawings show a preferred embodiment of an extensible handle according to the invention. Clearly, the extensible handle may be used for many types of tools, including cleaning tools, gardening tools, decorating tools, and the like. Some examples are shown in the drawings. In FIG. 1, the extensible handle is shown as used for a feather duster, and in FIG. 2 it is attached to a saw tool. In FIG. 3 a vacuum hose attachment is shown.

Figure 4:
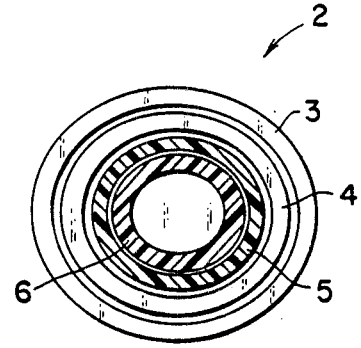
FIG. 4 is a horizontal cross-section on the line 4—4 of FIG. 1.

As shown in FIG. 1, a feather duster 1 is secured to one end of an extensible handle 2 comprising a series of telescoping tubes or cylinders 3, 4, 5, and 6 of generally elliptical cross-section. As shown in FIG. 4, each tube is of gradually reduced cross-sectional size so that each one is a close but slidably fit within the next. Although in FIG. 4 all the cylinders are shown as tubes, the innermost cylinder 6 could be of solid cross-section.

Each tube engages telescopically into the next tube in the handle. Adjacent tubes are rotatable relative to one another between a release position in which their elliptical axes are aligned and they are telescopically slidable relative to one another to change the length of the handle, and a locked position in which their axes are out of alignment and they are held against relative axial movement by the binding engagement between their opposing elliptical surfaces. With proper selection of elliptical cross-sections, the engagement provides a substantial seal for adjacent tubes. FIG. 4 shows all tubes with their elliptical axes aligned.

Figure 5A:
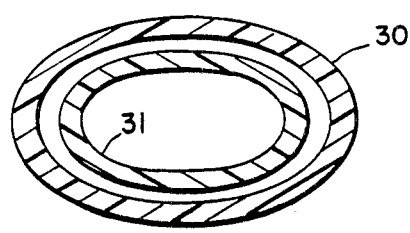
FIGS. 5A and 5B are exaggerated cross-sectional views through two of the tubes to depict the locking action between the elliptically shaped tubes.
Figure 5B:
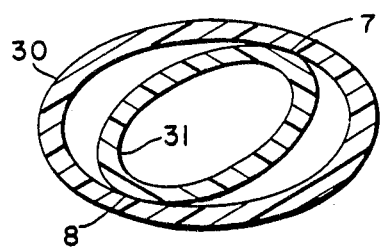

FIGS. 5A and 5B show two of the tubes 30 and 31 with their ellipses exaggerated so that the sealing action is clear. In FIG. 5A the two tubes 30 and 31 have their elliptical axes aligned. In FIG. 5B the innermost tube 31 has been rotated out of alignment so that it binds against the outer tube 30 at points 7 and 8.

The tubes may be made of any suitable, relatively rigid material, such as plastic or aluminum, for example.

When the feather duster 1 is to be used to clean debris such as dust and cobwebs from remote locations, adjacent tubes of the handle can be adjusted until the necessary length is reached. Thus adjacent tubes are twisted into alignment, telescoped in or out to a desired length, and twisted out of alignment until they are locked together. This can be repeated for each adjacent pair of tubes in the handle until the overall desired length is reached. In the preferred embodiment, the handle 2 has four tubular sections, but more or less sections of selectable lengths may be provided according to the maximum extension desired.

Figure 2:
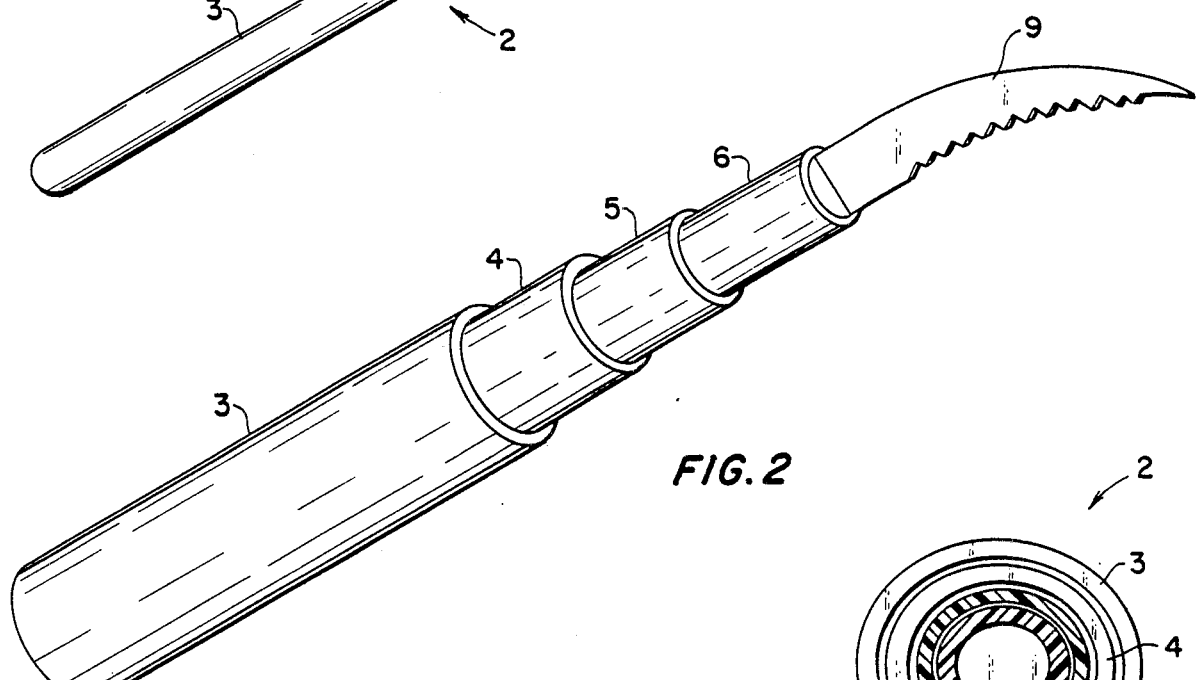
FIG. 2 is a view similar to FIG. 1 showing the handle collapsed with a saw tool attached to the handle.
Figure 3:
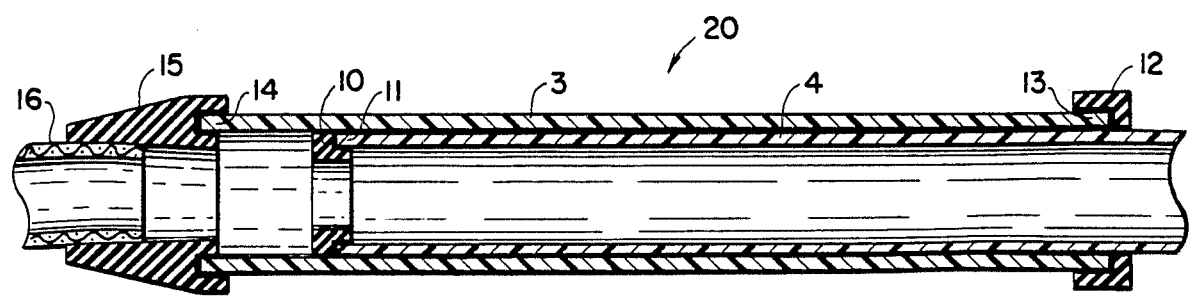
FIG. 3 is a sectional view of the handle on the line 3—3 of FIG. 2, showing a vacuum hose attachment.

In FIG. 2, the tubes are shown collapsed or telescoped to their minimum length. A sawing tool or head 9 is attached to the handle 2 in this example, which may be used for pruning, for example. Thus the handle can be adjusted to the necessary length to reach the branches of trees to be pruned.

When adjacent tubes are twisted until they bind together, the opposing elliptical surfaces will be substantially sealed. Thus the handle may also be used to form an extensible hose connector for a vacuum cleaner, as illustrated in FIG. 3. If the seal is insufficient for a vacuum hose, an extra seal such as an O-ring may be provided at each interconnection between adjacent tubes, as shown in FIG. 3.

FIG. 3 shows the seals between the telescoping ends of the end two tubes 3 and 4 of the handle. All the other engaging tube ends will be provided with similar seals. An inner seal 10 is provided on the end 11 of the tube 4 which engages inside the tube 3 to provide a seal between the end and the adjacent surface of the tube 3. An outer seal 12 is provided on the end 13 of the tube 3 which engages over the tube 4. The seals may be of any suitable material, such as foam rubber, rubber or foamed plastic, and allow the relative rotation between the elliptical tubes to provide the locking action.

The free end 14 of the tube 3 is provided with a rubber grommet 15 for connection to a flexible vacuum hose 16 of the type found on vacuum cleaners. The opposite end (not shown) of the sealed extension tube 20 is conventionally mounted on a vacuum cleaner attachment connecting device. The vacuum cleaner is thus provided with an extensible attachment handle for reading into remote corners and raised areas.

Figure 6A:
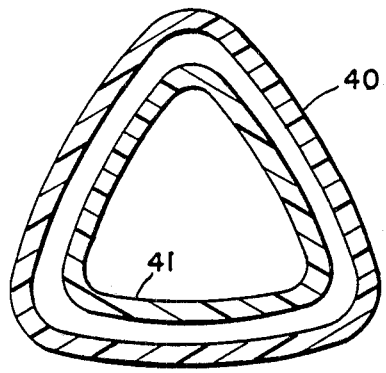
FIGS. 6A and 6B are exaggerated cross-sectional views through two tubes to depict the locking action between slightly triangularly shaped tubes.
Figure 6B:
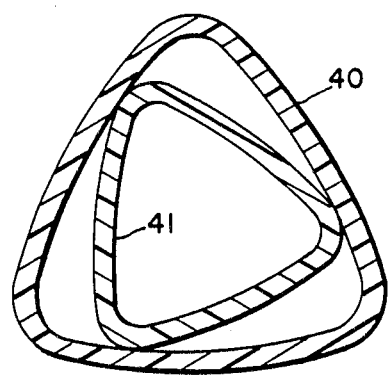

FIGS. 6A and 6B show an alternate embodiment of two tubes 40 and 41 having slightly triangularly shaped noncircular cross-sections. In FIG. 6A the tubes 40 and 41 are shown having their respective axes aligned and in FIG. 6B the innermost tube 41 is rotated out of alignment so that it binds against the outer tube 40.

Figure 7A:
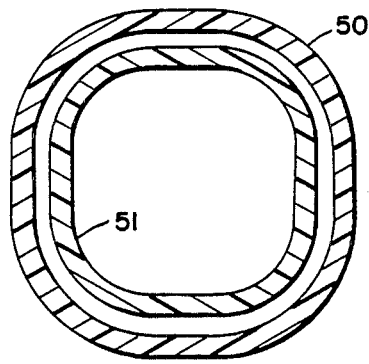
FIGS. 7A and 7B are exaggerated cross-sectional views through two of the tubes to depict the locking action between rectangularly shaped tubes.
Figure 7B:
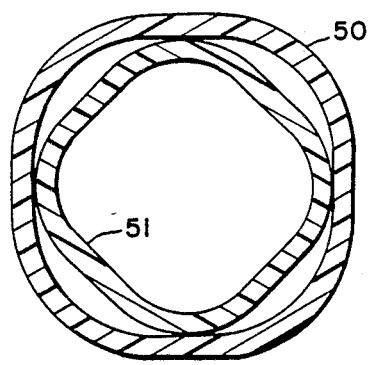

FIGS. 7A and 7B and FIGS. 8A and 8B show similar structures for noncircular tube structures with generally rectangular and pentagonal cross-sectional structures. In FIG. 7A the tubes 50 and 51 are shown having their respective axes aligned and in FIG. 7B the innermost tube 51 is rotated out of alignment so that it binds against the outer tube 50.

Figure 8A:
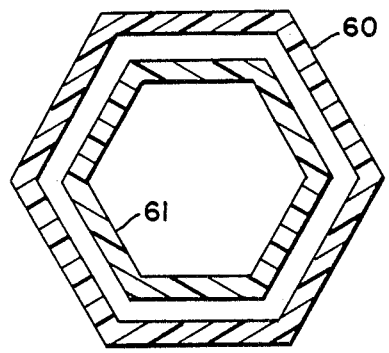
FIGS. 8A and 8B are exaggerated cross-sectional views through two of the tubes to depict the locking action between pentangonally shaped tubes.
Figure 8B:
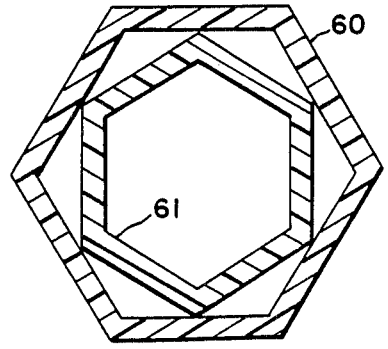

Similarly, in FIG. 8A, the two tubes 60 and 61 have their respective axes aligned and in FIG. 8B the innermost tube 61 has been rotated out of alignment so that it binds against the outer tube 60.

Clearly, the handle may be used for any type of cleaning tool having a handle, and may be used for other types of handled tools. Gardening tools such as pruning shears often have to be used in relatively remote locations, and if these tools were provided with extensible handles as described above, they could be used in remote locations without a ladder. In another application, a clamp could be secured at one end of the extensible handle for passing things to people in out-of-reach locations, e.g. on roofs, building sites, airplanes and the like.

The extensible handle is relatively inexpensive, easy to adjust and allows ready access to places which are otherwise out of normal reach.

While a preferred embodiment of the present invention has been described above, it will be understood that modifications and changes may be made to the disclosed embodiment which are within the scope of the invention, which is defined by the appended claims.

I claim:

1. An extensible handle for a tool comprising:
   a series of at least three telescopically engaged tubular members of corresponding non-circular cross-sectional shape;
   connector means at one end of the handle for securing it to a tool;
   each tubular member being of uniform cross-sectional shape and size along its length;
   each adjacent pair of telescopically engaged tubular members having slightly different cross-section dimensions sufficient for allowing relative rotation between said members between a first, released position in which the opposed telescoping inner and outer surfaces of said adjacent members are aligned and spaced apart in the same angular orientation to permit relative sliding movement between the members, and a second, locked position in which said opposed surfaces are out of alignment and in frictional engagement with each other to lock said members against relative axial movement.

2. The handle as claimed in claim 1, wherein the members are of elliptical cross-section.

3. The handle as claimed in claim 1, in which there are four telescopically engaged members.

4. The handle as claimed in claim 1, wherein said members are of gradually decreasing dimensions from one end of the handle to the other, the largest dimension member defining the handle end.

5. The handle as claim in claim 1, wherein each telescoping connection between adjacent pairs of members includes inner seal means for providing a sliding seal engagement between the end of the inner member and the opposed internal surface of the outer member, outer seal means for providing a sliding seal engagement between the end of the outer member and the opposed outer surface of the inner member of the pair, and said connector means comprises means for connecting one end of the handle to a vacuum cleaner attachment.

6. A tool assembly comprising an extensible handle and a tool secured to one end of the handle, the extensible handle comprising a series of at least three telescopically engaged tubular members of corresponding non-circular cross-sections and of gradually increasing dimensions from one end to the other end of the handle, each member being of uniform cross-sectional shape and size along its entire length, and the difference in dimensions between each adjacent telescopically engaged pair of members being sufficient to allow relative rotation between the pair of members between a first, released position in which their opposed inner and outer surfaces are spaced apart and in the same relative angular orientation, and a second, locked position in which said opposed surfaces are in frictional contact with one another around at least part of their peripheries to lock the pair of members against relative axial movement.

7. The tool assembly as claimed in claim 6, wherein the tool is a feather duster.

8. The tool assembly as claimed in claim 7, wherein the smallest dimension member is at the end of the handle connected to the tool.

9. The tool assembly as claimed in claim 7, wherein the tool is a vacuum cleaner attachment, the opposite end of the handle to the tool having means for connection to a flexible vacuum cleaner hose.

10. An extensible handle for a tool comprising:
    a series of at least three telescopically engaged elongate tubular members, each member being of constant outer and inner elliptical cross-section along its length, the cross-sectional dimensions of successive members in the series decreasing from one end of the handle to the opposite end;

the series of members including a first end member at the largest dimension end of the handle, a second end member at the smallest dimension end of the handle, the free end of the second end member comprising means for connection to a tool, and at least one intermediate member having an outer elliptical dimension which is a close telescoping sliding fit in the preceding tubular member of the series at one end of the intermediate member and an inner elliptical dimension which telescopically receives the next successive member of the series at the opposite end of the intermediate member;

each adjacent pair of telescopically engaged tubular members having slightly different cross-sectional dimensions sufficient for allowing relative rotation between said members between a first, released position in which the opposed telescoping inner and outer surfaces of said adjacent members are aligned and spaced apart in the same angular orientation to permit relative sliding movement between the members, and a second, locked position in which said opposed surfaces are out of alignment and in frictional engagement with each other to lock said members against relative axial movement.

* * * * *